United States Patent
Kago et al.

(10) Patent No.: US 8,433,362 B2
(45) Date of Patent: Apr. 30, 2013

(54) HANDOVER CONTROL APPARATUS

(75) Inventors: Yoshiyuki Kago, Nishio (JP); Michio Shamoto, Konan (JP); Yoichi Yoshikura, Obu (JP); Yusuke Morioka, Nishio (JP); Mitsuo Taniguchi, Anjo (JP)

(73) Assignee: Denso Corporation, Kariya (JP)

( * ) Notice: Subject to any disclaimer, the term of this patent is extended or adjusted under 35 U.S.C. 154(b) by 180 days.

(21) Appl. No.: 13/135,480

(22) Filed: Jul. 6, 2011

(65) Prior Publication Data

US 2012/0015685 A1    Jan. 19, 2012

(30) Foreign Application Priority Data

Jul. 19, 2010   (JP) .................................. 2010-162372

(51) Int. Cl.
*H04W 36/00* (2009.01)
(52) U.S. Cl.
USPC ........... 455/525; 455/436; 455/439; 455/442; 455/99; 370/332; 370/338; 370/331
(58) Field of Classification Search ................. 455/525, 455/436, 439, 450, 451, 452.1, 452.2, 420, 455/435.1, 440, 441, 442, 456.1, 464, 67.11, 455/67.16, 99, 297, 115.3, 522, 444, 560, 455/561, 456.6, 438; 370/331, 332, 338, 370/260, 342, 362, 335
See application file for complete search history.

(56) References Cited

U.S. PATENT DOCUMENTS

| | | | | |
|---|---|---|---|---|
| 7,636,583 | B2 * | 12/2009 | Ode et al. | 455/522 |
| 8,244,275 | B2 * | 8/2012 | Islam | 455/456.1 |
| 2001/0006514 | A1 * | 7/2001 | Park | 370/331 |
| 2007/0058586 | A1 * | 3/2007 | Ode et al. | 370/331 |
| 2007/0217384 | A1 * | 9/2007 | Mitani | 370/338 |
| 2010/0040161 | A1 * | 2/2010 | Ode et al. | 375/260 |
| 2010/0056157 | A1 * | 3/2010 | Verona et al. | 455/438 |
| 2011/0263257 | A1 * | 10/2011 | Kago et al. | 455/436 |

FOREIGN PATENT DOCUMENTS

| | | |
|---|---|---|
| JP | 08-154264 | 6/1996 |
| JP | 10-075473 | 3/1998 |
| JP | 11-136738 | 5/1999 |
| JP | 2001-157258 | 6/2001 |
| JP | 2002-368671 | 12/2002 |
| JP | 2006-261845 | 9/2006 |
| JP | 2007-251654 | 9/2007 |
| JP | 2007-306115 | 11/2007 |
| JP | 2008-278052 | 11/2008 |
| JP | 2011-229084 | 11/2011 |

* cited by examiner

*Primary Examiner* — Tan Trinh
(74) *Attorney, Agent, or Firm* — Harness, Dickey & Pierce, PLC

(57) ABSTRACT

A handover control apparatus selects, as a target station, an adjacent station having an upturn and stable transition trend of reception level of a radio wave received by a radio, when necessity to carry out handover is determined, and performs handover for switching from a serving station to the target station when the transition trend of the reception level of the received radio wave from the serving station is in a downturn trend and a calculation value of a serving station approximation equation is smaller than a calculation value of an adjacent station approximation equation at a determination timing.

19 Claims, 10 Drawing Sheets

FIG. 7

| TRAVEL SPEED (km/h) | SAMPLE INTERVAL (sec) |
|---|---|
| 0-20 | m × 1.2 |
| 20-40 | m |
| 40-60 | m × 0.8 |
| 60-80 | m × 0.6 |
| 80- | m × 0.4 |

FIG. 8

| # OF HANDOVERS | SAMPLE INTERVAL (sec) |
|---|---|
| 0 | m × 1.2 |
| 1-2 | m |
| 3-4 | m × 0.8 |
| 5- | m × 0.6 |

HANDOVER CONTROL APPARATUS

CROSS REFERENCE TO RELATED APPLICATION

The present application is based on and claims the benefit of priority of Japanese Patent Application No. 2010-162372, filed on Jul. 19, 2010, the disclosure of which is incorporated herein by reference.

TECHNICAL FIELD

The present disclosure generally relates to a handover control apparatus that performs handover control for switching communication stations that communicate with a communication terminal in a movable body such as an automobile.

BACKGROUND INFORMATION

It is well-known that a handover control apparatus performs handover control based on an instantaneous value of a reception level or a receive signal (strength) level of a radio wave from a communication station. An operation scheme of the conventional handover control apparatus is explained with reference to FIGS. 12 and 13.

FIG. 12 is an illustration of a situation that a vehicle C equipped with an in-vehicle terminal having a handover control apparatus moves along a route R, and FIG. 13 is a diagram showing two transition trends of reception level, a transition trend of a radio wave from a communication station B1 and a transition trend of a radio wave from a communication station B2.

In FIG. 12, the distance between the in-vehicle terminal and the communication station B1 is shorter than the distance between the in-vehicle terminal and the communication station B2. However, at some points during the travel of the vehicle C along the route R, the terminal and the station B1 are electrically blocked from each other by a building Sh interposed there between, as shown in FIG. 12. Therefore, the reception level of the radio wave received by the terminal from the station B1 changes drastically during the travel of the vehicle C along the route R. More specifically, as shown in FIG. 13, the reception level of the radio wave received by terminal from the station B1 transits at a high level between time t10 and time t11, during which no blocking building Sh exists between the terminal and the station B1, and, at time t11 the blocking of the radio wave by the building Sh starts. Then, the reception level starts to steeply decrease after time t11, to a reception level that is lower than a reception level of the radio wave from the station B2 at time t12. Further, the reception level of the radio wave from the station B1 starts to increase at time t13, to exceed the reception level of the radio wave from the station B2 at time t14, to start to transit at the high level after time t15, at which the blocking building Sh disappears from the space between the terminal and the station B1. In other words, the reception level of the radio wave from the station B1 temporarily drops due to the building Sh. On the other hand, due to no blocking by a building, a transition trend of the reception level of the radio wave from the station B2 is stable during the travel of the vehicle C along the route R, although the distance between the terminal and the station B2 is greater than the distance between the terminal and the station B1, and the reception level of the station B2 at the terminal is lower than the reception level of the station B1 at the terminal, as shown in FIGS. 12 and 13.

In the above-described situation, the conventional handover control apparatus performs handover in the following manner. After performing wireless communication with a serving station B1 between time t10 and time t12 due to the reception level of the station B1 being higher than the reception level of the station B2, the conventional handover control apparatus performs handover by switching the serving station B1 to the communication station B2 at time t12, at which time the reception level of the station B1 falls below the reception level of the station B2. Further, the conventional handover control apparatus performs handover by switching the serving station back to the communication station B1 at time t14, at which time the reception level of the station B1 exceeds the reception level of the station B2, and performs wireless communication with the station B1 that serves as the serving station thereafter.

The conventional handover control apparatus performs, as described above, handover based on an instantaneous reception level of the received radio wave from the communication station, thereby causing a frequent switching between two or more serving stations, between the station B1 and the station B2 in this case. Such phenomenon of frequent switching is called as a "roll-over."

In addition, if we assume another station B3 having a reception level continuously higher than the reception level of both of the stations B1 and B2 after time t12, handover is performed in the following manner.

More specifically, the conventional handover control apparatus performs handover at time t12 from the station B1 to the station B2, and, immediately after the above handover, performs another handover from the station B2 to the station B3, to have wireless communication with the station B3 which serves as a serving station. The handover control scheme by the conventional handover control apparatus causes unnecessary handover due to a handover determination based on an instantaneous reception level of the received radio wave from a communication station.

Instead, one handover immediately after the other handover should rather be performed as only one handover. In the above-described case, one handover from the station B1 to the station B2 with the other handover subsequently performed from the station B2 to the station B3 should rather be one handover from the station B1 to the station B3.

When handover is performed, the wireless communication between the terminal and the communication station is temporarily interrupted, and causes an unstable wireless communication and lowers communication throughput, which is why frequent handover is not desirable.

For solving such a problem, Japanese Patent 2007-251654 (JP '654) teaches to measure the number of handovers per unit time, and changes the handover threshold that triggers handover according to the measured number of handovers. When the number of handovers performed per unit time is great, the number of handovers can be decreased by changing the handover threshold to have a lower value. As a result, unnecessary handover is prevented.

The technique in JP '654 decreases the number of handovers simply by changing the threshold, running a risk of preventing a required handover as well. For example, in an urban area where there are many blocking objects, the radio wave from the serving station to the terminal is transmitted through multiple paths (i.e., a multi-path environment). In such an environment, the instantaneous value of the reception level drastically changes when the terminal travels by only a small amount. As a result, the reception level frequently falls below the handover threshold, thereby increasing the number of handovers. Therefore, the technique in JP '654 should naturally decrease the handover threshold value in the multi-path environment, resulting to prevent a "necessary/required"

handover to an adjacent station for continuation of the wireless communication with a current serving station, without regard to a decreased reception level of the current serving station. Further, an already-decreased handover threshold value described above triggers handover to the adjacent station at a timing that is too late for keeping the uninterrupted wireless communication between the terminal and the current serving station, if the decrease of the reception level at the terminal is steep.

In addition, handover may be performed based on an averaged reception level instead of the instantaneous reception level. In such modification of the handover control scheme, handover control for a period between times t12 and t14 in FIG. 13 is prevented, due to the average of the reception level of the station B1 exceeding the average of the reception level of the station B2 for the same period.

However, the transition trend of the reception level of the radio wave received from the communication station B1 may not necessarily be stable even when the averaged reception level from the station B1 for a certain reception period is high. For example, in the above modification example, handover to the communication station B2 will be performed only on condition that the averaged reception level of the station B2 for a certain period exceeds the averaged reception level of the station B1, in spite of to a drastic change of the reception level of the station B2 for the same period. As a result, the terminal cannot perform a stable wireless communication after such handover to the station B2.

SUMMARY OF THE DISCLOSURE

In view of the above and other problems, the present disclosure provides a handover control apparatus that provides a stable wireless communication between a terminal and a serving station after performing handover while preventing unnecessary handover.

In an aspect of the present disclosure, a handover control apparatus that performs handover from a serving station to a target station, which is selected from among adjacent stations adjacent to the serving station, for wireless communication of a terminal, in which the handover control apparatus is disposed, includes: a memory controller that stores in a memory unit a serving station reception level by a radio unit as a serving station reception history and an adjacent station reception level by the radio unit as an adjacent station reception history; a determination unit that determines if a handover is necessary based on the serving station reception level; a reception unit that determines a transition trend and a stability of the serving station reception level and of an adjacent station reception level when handover is determined to be necessary; a target selection unit that selects the target station when the adjacent station reception level is determined to be in an upturn trend and stable by the reception unit; and a handover unit that performs handover when the reception unit determines (a) that the serving station reception level is in a downturn trend and (b) that the serving station reception level at a determination timing for determining that handover is necessary is lower than the target station reception level.

In the above configuration of the handover control apparatus, an adjacent station having an upturn and stable transition trend of the reception level by the radio unit is selected as the target station upon having determination of the necessity of handover. Further, when (a) the that the serving station reception level is in a downturn trend, and (b) the serving station reception level at a determination timing for determining that handover is necessary is lower than the target station reception level, handover from the serving station to the target station is performed. The handover control apparatus of the present disclosure secures a stable wireless communication with the serving station after performing handover.

Further, in the above configuration, the determination unit preferably determines that handover is necessary based on determination that the serving station reception level is lower than a handover threshold. In such case, the handover threshold may have a value greater than the minimum requirement value that prevents interruption of the wireless communication between the radio unit and the serving station.

Further, in the above configuration, the memory controller stores the serving station reception level at regular intervals as the serving station reception history, and the reception unit (a) formulates a serving station reception level approximation equation based on the serving station reception history at predetermined number of timings including the determination timing, and (b) estimates a transition trend of the serving station reception level by using the serving station reception level approximation equation. Therefore, by using the serving station reception level approximation equation, the transition trend of the reception level of the serving station is determined.

Further, in the above configuration, the reception unit formulates a high-degree equation as the serving station reception level approximation equation, and the reception unit estimates the transition trend of the serving station reception level either as an upturn trend, a downturn trend, or a stable trend by using the approximation equation, based on two reception levels respectively calculated at a prior-to-determination timing and at the determination timing in the serving station reception history and comparison of two calculated reception levels. That is, when a calculation value of the serving station reception level approximation equation at the determination timing compared with a calculation value of the serving station reception level approximation equation at the prior-to-determination timing, which is set as a point in time by a predetermine number of timings prior to the determination timing, to see which one of the two calculation values is greater than the other. If the calculation value at the determination timing is greater than the calculation value at the prior-to-determination timing, the transition trend of the reception level of the serving station is determined as an upturn trend. If the calculation value at the determination timing is smaller than the calculation value at the prior-to-determination timing, the transition trend of the reception level of the serving station is determined as a downturn trend. If the calculation value at the determination timing is same as the calculation value at the prior-to-determination timing, the transition trend of the reception level of the serving station is determined neither as the upturn trend nor the downturn trend.

Further, in the above configuration, the reception unit formulates a linear equation as the serving station reception level approximation equation, and the reception unit estimates the transition trend of the serving station reception level either as an upturn trend, a downturn trend, or a stable trend based on a coefficient of the linear equation having a positive value, a negative value, or a null value.

Further, in the above configuration, the memory controller stores at regular intervals in the memory unit an adjacent station reception level as an adjacent station reception history, and the reception unit (a) formulates an adjacent station reception level approximation equation based on the adjacent station reception history at predetermined number of timings including the determination timing, and (b) estimates a transition trend of the adjacent station reception level by using the adjacent station reception level approximation equation. In this manner, an adjacent station reception level approximation equation is used to determine the transition trend of the reception level of the radio wave of the adjacent station.

Further, in the above configuration, the reception unit formulates a high-degree equation as the adjacent station reception level approximation equation, and the reception unit estimates the transition trend of the adjacent station reception level either as an upturn trend, a downturn trend, or a stable trend by using the approximation equation based on two reception levels calculated at a prior-to-determination timing and at the determination timing in the adjacent station reception history and comparison of two calculated reception levels. The determination of the transition trend is performed in the same manner as described above. That is, by the comparison of the calculation values of two timings, the transition trend of the reception level of the adjacent station is preferably determined either as the upturn trend, the downturn trend, or none of the upturn trend or the downturn trend.

Further, in the above configuration, the reception unit formulates a linear equation as the adjacent station reception level approximation equation, and the reception unit estimates the transition trend of the adjacent station reception level either as an upturn trend, a downturn trend, or a stable trend based on a coefficient of the linear equation having a positive value, a negative value, or a null value. That is, when the coefficient of the linear equation has a positive value, the transition trend of the radio wave reception level is determined as an upturn trend, and when the coefficient of the linear equation has a negative value, the transition trend of the radio wave reception level is determined as a down trend. If the coefficient of the linear equation is equal to zero, the transition trend of the radio wave reception level is determined neither as the upturn trend nor the downturn trend.

In the above, the regular intervals may be a period of time that allows a formulation of the serving station reception level approximation equation reflecting the transition trend of the radio wave from the serving station, and may be a period of time that allows a formulation of the adjacent station reception level approximation equation reflecting the transition trend of the radio wave from the adjacent station. For example, the regular interval may be determined as a constant time length of "every second" or the like.

Further, the predetermined number of timings may be points in time that allow a formulation of the serving station reception level approximation equation reflecting the transition trend of the radio wave from the serving station, and may be points in time that allow a formulation of the adjacent station reception level approximation equation reflecting the transition trend of the radio wave from the adjacent station. For example, the predetermined number may be 5 points in time or the like, preferably be a greater number of points.

Further, in the above configuration, the reception unit preferably estimates a stability of the adjacent station reception level based on (a) a reception level calculation value of the adjacent station reception level approximation equation at each of plural timings which are used to formulate the adjacent station reception level approximation equation and (b) an instantaneous adjacent station reception level at same timings. In this manner, the stability of the reception level of the adjacent station is determined based on the calculation value and the instantaneous value of the reception level calculated by using the adjacent station reception level approximation equation.

Further, in the above configuration, the reception unit calculates a difference between the reception level calculation value of the adjacent station reception level approximation equation and the instantaneous reception level at each of the plural timings, and determines whether the difference is equal to or smaller than a threshold at all of the above timings, and the reception unit estimates (a) that the transition trend of the adjacent station reception level is stable when the difference is equal to or smaller than the threshold at all of the above timings, and (b) that the transition trend of the adjacent station reception level is not stable when the difference is not equal to or smaller than the threshold at at least one of the above timings.

In the above, a predetermined value of the threshold may be determined as a value that allows stability evaluation of the reception level of the radio wave from the adjacent station. For example, the threshold may be 5% of the calculation value of the adjacent station reception level approximation equation at the determination timing, or the like.

Further, in the above configuration, the target selection unit preferably selects, from among a plurality of adjacent stations having the reception level being in the upturn trend and stable, a target station that has a greatest calculation value of the reception level by using the adjacent station reception level approximation equation at the determination timing.

Further, in the above configuration, the target selection unit preferably selects, from among a plurality of adjacent stations having the reception level being in the upturn trend and stable, a target station that has a greatest instantaneous value of the reception level at the determination timing.

Further, in the above configuration, the target selection unit preferably selects, from among a plurality of adjacent stations having the reception level being in the upturn trend and stable, a target station that has a greatest calculation value of the reception level by using the adjacent station reception level approximation equation at a timing that is set after a preset time from the determination timing. In addition, as the preset time from the determination timing, the minimum time length that allows a stabilization of the throughput after performing handover from the serving station to the target station may be used. That is, a point in time after the throughput stabilization may be set as the above timing.

The distance between two points for storing the reception history of the serving/adjacent station by the terminal on the move may become long, if the travel speed of the terminal is great. Therefore, when high reliability is desired for the above approximation equations, the interval of storing the reception history may preferably be shorter. On the other hand, the distance between two points for storing the reception history of the serving/adjacent station by the terminal on the move may become short, if the travel speed of the terminal is small. Therefore, the reception level of the radio wave from the serving/adjacent station does not change drastically at those two points. Thus, in such case, the interval of storing the reception history may not necessarily be decreased, for formulating a highly reliable approximation equations.

Therefore, in the above configuration, the memory controller preferably stores in the memory unit as the serving station reception history the serving station reception level at an interval that decreases in proportion to an increase of a travel speed of the terminal detected by a travel speed detector. The memory controller may store in the memory unit as the adjacent station reception history the adjacent station reception level at an interval that decreases in proportion to an increase of a travel speed of the terminal detected by a travel speed detector. In this manner, formulation of a highly reliable serving station reception level approximation equation or a highly reliable adjacent station reception level approximation equation is enabled.

Further, in the above configuration, the memory controller preferably stores in the memory unit as the serving station reception history the serving station reception level at an interval that defines a constant travel distance of the terminal based on a travel speed of the terminal detected by a travel speed detector. The memory controller may store in the memory unit as the adjacent station reception history the adjacent station reception level at an interval that defines a constant travel distance of the terminal based on a travel speed of the terminal detected by a travel speed detector. In this manner, too, formulation of a highly reliable serving station reception level approximation equation or a highly reliable adjacent station reception level approximation equation is enabled.

Based on the number of handovers per unit time, the travel speed of the terminal may be estimated. That is, when the number of handovers per unit time is great, the travel speed of the terminal is estimated to be great, and when the number of handovers per unit time is small, the travel speed of the terminal is estimated to be small.

Therefore, in the above configuration, the memory controller preferably stores in the memory unit as the serving station reception history the serving station reception level at an interval that decreases in proportion to an increase of handover frequency. The memory controller may store in the memory unit as the adjacent station reception history the adjacent station reception level at an interval that decreases in proportion to an increase of handover frequency. In this manner, even if the travel speed of the terminal cannot be acquired, a highly reliable serving station reception level approximation equation or a highly reliable adjacent station reception level approximation equation is formulated.

BRIEF DESCRIPTION OF THE DRAWINGS

Objects, features, and advantages of the present disclosure will become more apparent from the following detailed description made with reference to the accompanying drawings, in which:

FIG. 7 is a diagram of intervals decreasing in proportion to an increase of a travel speed of a terminal in a modification of the embodiment of the present disclosure;

FIG. 8 is a diagram of intervals decreasing in proportion to a number of handover per unit time in a modification of the embodiment of the present disclosure;

DETAILED DESCRIPTION

Figure 1:
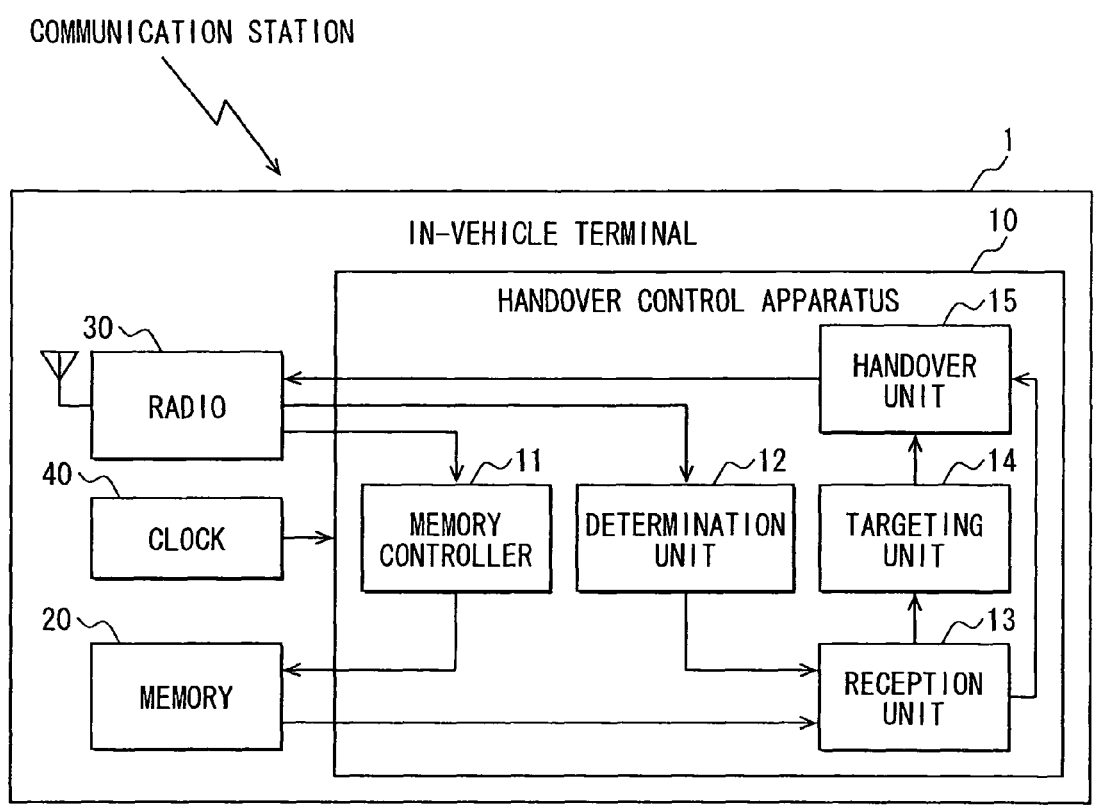
FIG. 1 is a block diagram of a handover control apparatus in an embodiment of the present disclosure.

With reference now to FIG. 1, in the present embodiment, a handover control apparatus 10 is disposed in an in-vehicle terminal 1 or an in-vehicle unit that is carried by a vehicle not illustrated in FIG. 1. The in-vehicle terminal 1 also includes a memory 20, a radio 30 (i.e a radio communication unit) and a clock 40 (i.e a timer).

The memory 20 is, for example, configured to have well-known hard disks and the like, and the clock 40 is, for example, configured to have a well-known timer and the like. In addition, the radio 30 is a well-known communication apparatus having plural antennas (not illustrated) for wireless communication with a serving station and for monitoring of the radio wave from adjacent stations.

[The handover control apparatus 10 using the memory 20, the radio 30 and the clock 40 performs handover control for wireless communication of the in-vehicle terminal 1, by switching a serving station to one of adjacent stations located nearby, which is to be serving as a next serving station. The next serving station may be called a target station. Although the handover control apparatus 10 is connected to the clock 40 of the in-vehicle terminal 1 in the present embodiment, the apparatus 10 may be connected to the clock 40 of the vehicle, or the apparatus 10 may have a built-in clock 40.

The handover control apparatus 10 includes a computer having a well-known CPU and memory, and various functions are performed by the program that is stored in the memory and executed in the CPU. As shown in. FIG. 1, the handover control apparatus 10 is configured to have a memory controller 11, a determination unit 12 that determines handover necessity, a reception unit 13 determines a radio wave reception level (i.e a radio wave receiving signal (strength) level), a targeting unit 14 that selects a target station, and a handover unit 15 that performs handover control.

The memory controller 11 is connected to the memory 20, the radio 30 and the clock 40. The memory controller 11 saves, at regular intervals (e.g., at every second) in the memory 20, a reception level of the radio wave from a serving station received by the radio 30 (i.e., a field intensity), reception time information indicative of a reception time of the radio wave, and station identification information for identifying the serving station, as a serving station reception history. In addition, the memory controller 11 saves, at regular intervals (e.g., at every second) in the memory 20, a reception level of the radio wave from an adjacent station received by the radio 30 (i.e., a field intensity), reception time information indicative of a reception time of the radio wave, and station identification information for identifying the adjacent station, as an adjacent station reception history. The regular interval at every second may be changed to other intervals, such as every other seconds or the like. The timing to save the serving station reception history and the adjacent station reception history in the memory 20 may be the same timing or different timings, such as alternating timing.

The determination unit 12 is connected to the radio 30 and the reception unit 13. Based on the reception level of the radio wave received by the radio 30 from a serving station the determination unit 12 determines whether it is necessary to carry out handover from the serving station to a target station. Specifically, the determination unit 12 determines whether the reception level of the radio wave received by the radio 30 from the serving station is equal to or lower than a certain handover threshold, and when it determines to be equal to or lower than the handover threshold the determination unit 12 outputs a signal that indicates it is necessary to perform handover to the reception unit 13. In addition, the predetermined handover threshold may be a value greater than a minimum boundary that prevents interruption of the wireless communication between the radio 30 and a serving station.

The reception unit 13 is connected to the memory 20, the determination unit 12, the targeting unit 14 and the handover unit 15. When the determination unit 12 sends a signal to the reception unit 13 indicating that a handover is necessary, the serving station reception history is retrieved from the memory 20, and the reception unit 13 formulates a serving station approximation equation to approximate and estimate transition of the reception level of the radio wave received from the serving station. Based on the serving station approximation equation, the reception unit 13 determines a transition trend of the reception level of the radio wave received from the serving station. When the determination unit 12 sends the signal to the reception unit 13, the reception unit 13 also retrieves the adjacent station reception history from the memory 20. In a similar manner, the reception unit 13 formulates an adjacent station approximation equation to approximate and estimate transition of the reception level of the radio wave received from the adjacent station. Based on the adjacent station approximation equation formulated above, the reception unit 13 then determines the transition trends and stability of the reception level of the radio wave received from the adjacent station.

Figure 2:
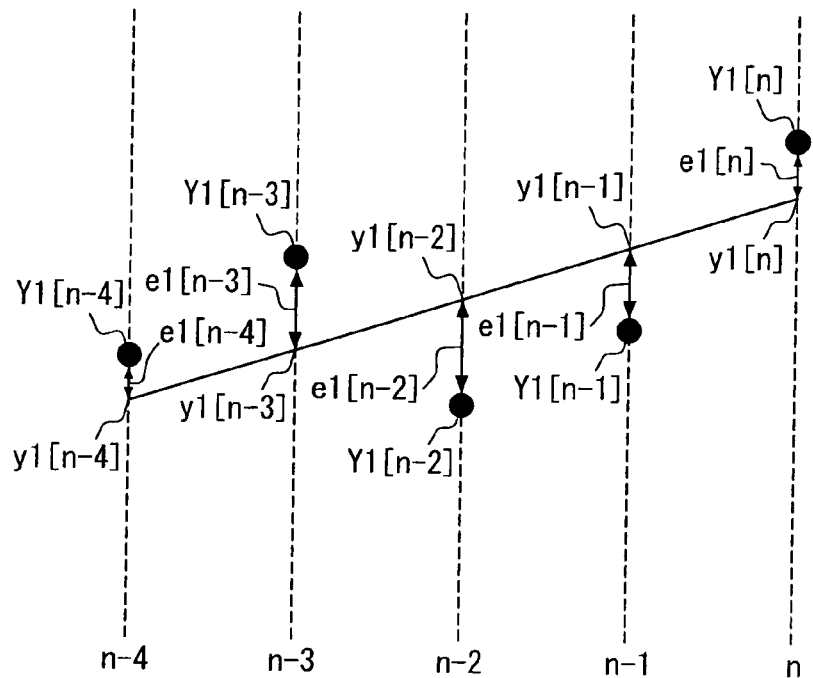
FIG. 2 is an illustration of an approximation equation of reception level transition of a serving station in the embodiment of the present disclosure.

FIG. 2 provides an example of the serving station approximation equation that approximates the transition of the reception level of the radio wave received from a serving station. In the following, a method of formulating a serving station approximation equation as well as a method of determining a transition trend of the radio wave from the serving station is explained with reference to FIG. 2.

In the present embodiment, the reception unit 13 retrieves from the memory 20 the serving station reception history for five latest timings, t="n" to "n−4", where t="n" is the most recent timing. The most recent timing, t="n", is the time that the reception unit 13 received the signal from the determination unit 12 requesting the performance of a handover. The reception unit 13 uses a linear equation "$y1[t]=a1 \cdot t+b1$" as a serving station approximation equation. After retrieving the serving station reception history, the reception unit 13 calculates coefficients "a1" and "b1" in the serving station approximation equation by using a least-square method. In FIG. 2, the straight line indicates the serving station approximation equation. In the serving station approximation equation, "y1[t]" indicates a calculation value of the reception level at time "t," and a coefficient "a1" indicates a slope of the linear equation. Also, the black circles "·" to indicates instantaneous values, Y1[t], at timings of t="n" to "n−4." The above timing t="n" and the above five timings indicates determination timings in claims.

When the coefficient "a1" of the serving station approximation equation takes a positive value (i.e., a "plus (+)" value), the reception unit 13 determines that the transition trend of the reception level of the radio wave received from the serving station is in an upturn trend. On the other hand, when coefficient "a1" of the serving station approximation equation takes a negative value (i.e., a "minus (−)" value), the reception unit 13 determines that the transition trend of the reception level of the radio wave received from the serving station is in a downturn trend. Further, when the coefficient "a1" of the serving station approximation equation takes a value of "zero (0)," the reception unit 13 determines that the transition trend of the reception level of the radio wave received from the serving station is neither in an upturn trend nor a downturn trend. The reception unit 13 in the present embodiment determines a transition trend of the reception level of the radio wave received from a serving station by using the coefficient "a1" of the serving station approximation equation in the above-described manner.

When the transition trend is determined in an upturn, it is highly likely that the reception level of the radio wave received from a serving station is going to increase, thereby a stronger radio wave is expected. On the other hand, when the trend is determined in a downturn, it is highly likely that the reception level of the radio wave received from a serving station is going to decrease, thereby a weaker radio wave is expected, with no prospect of having a stronger radio wave to come. Further, when the trend is not determined in an upturn or a downturn, it is highly likely that the reception level of the radio wave received from a serving station is not going to increase or decrease, thereby a stable reception level of the radio wave is expected.

Figure 3A:
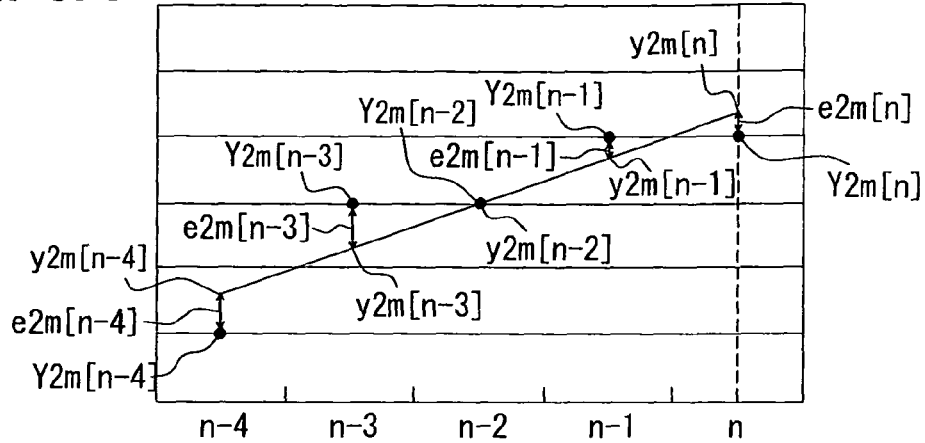
FIGS. 3A, 3B, and 3C are diagrams of reception level transition of the radio wave from an adjacent station in the embodiment of the present disclosure
Figure 3B:
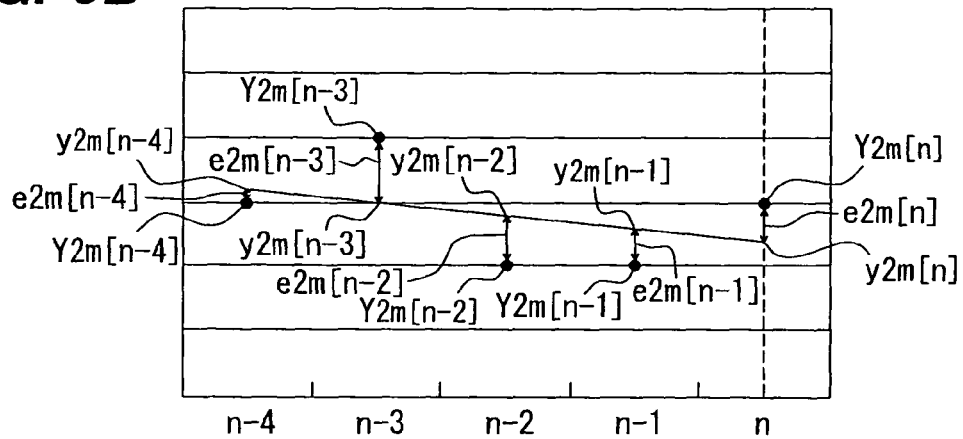
Figure 3C:
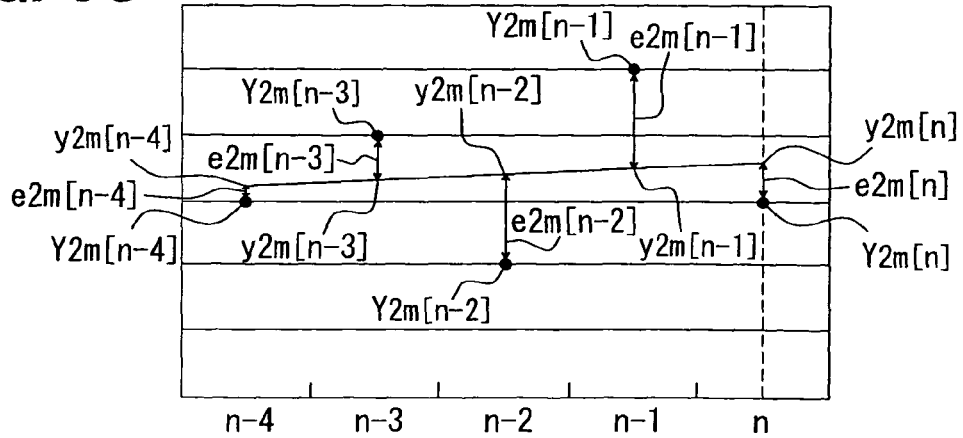

With further reference to FIGS. 3A, 3B, and 3C. In addition, when the determination unit 12 sends the signal to the reception unit 13, the reception unit 13 retrieves from the memory 20 the adjacent station reception history for "five latest timings" including an input timing, t="n". Further, the reception unit 13 in the present embodiment uses a linear equation "$y2m[t]=a2m \cdot t+b2m$" as an adjacent station approximation equation, and, after retrieving the adjacent station reception history, calculates coefficients "a2m" and "b2m" in the adjacent station approximation equation by using the least-square method. In addition, in an above adjacent station approximation equation, "y2m[t]" indicates a calculation value of the reception level at timings of "t," and a coefficient "a2m" indicates a slope. A subscript [m] is used to identify an adjacent station. The above-described input timing is a determination timing in claims.

When the coefficient "a2m" of the adjacent station approximation equation takes a positive value (i.e., a "plus (+)" value), the reception unit 13 determines that the transition trend of the reception level of the radio wave received from the adjacent station is in an upturn trend. On the other hand, when coefficient "a2m" of the adjacent station approximation equation takes a negative value (i.e., a "minus (−)" value), the reception unit 13 determines that the transition trend of the reception level of the radio wave received from the adjacent station is in a downturn trend. Further, when the coefficient "a2m" of the adjacent station approximation equation takes a value of "zero (0)," the reception unit 13 determines that the transition trend of the reception level of the radio wave received from the adjacent station is neither in an upturn trend nor a downturn trend. The reception unit 13 in the present embodiment determines a transition trend of the reception level of the radio wave received from an adjacent station by using the coefficient "a2m" of the adjacent station approximation equation in the above-described manner.

When the trend is determined in an upturn, it is highly likely that the reception level of the radio wave received from an adjacent station is going to increase, thereby a stronger radio wave is expected. On the other hand, when the trend is determined in a downturn, it is highly likely that the reception level of the radio wave received from an adjacent station is going to decrease, thereby a weaker radio wave is expected, with no prospect of having a stronger radio wave to come. Further, when the trend is not determined in an upturn nor a downturn, it is highly likely that the reception level of the radio wave received from an adjacent station is not going to increase or decrease, thereby a stable reception level of the radio wave is expected.

Further, the reception unit 13 determines a difference e2m[t] between a calculation value y2m[t] and an instantaneous value, Y2m[t], of the reception level, such that $e2m[t]=|y2m[t]-Y2m[t]|$ for each timing from t="n" to "n−4". The reception unit 13 further determines if e2m[t] is equal to or less than a predetermined value k2 for each timing from t="n" to "n−4" (i.e. is $e2m[t] \leq k2$). Where k2 may be set at 5% of a calculation value y2m[t] at timing t="n".

When the above difference e2m[t] is determined to be equal to or smaller than the value k2 for all timings, the reception unit 13 determines that the transition of the reception level of the radio wave received from the adjacent station is "stable." When the above difference e2m[t] is not equal to or smaller than the value k2 for any one timing, the reception unit 13 determines that the transition of the reception level of the radio wave received from the adjacent station is "not stable." As described above, the stability of the reception level of the radio wave from the adjacent station is determined by the reception unit 13 based on the above-described calculation value y2m[t] and the above-described instantaneous value Y2m[t]. When the transition trend is determined as "stable," it is highly likely that the transition of the reception level of the radio wave received from the adjacent station is stable, and stable wireless communication is expected from now on. On the other hand, when the transition trend is determined as "not stable," it is highly likely that the transition of the reception level of the radio wave received from the adjacent station is not stable, and stable wireless communication is not expected.

FIG. 3A shows a graph of a linear equation that has a positive coefficient a2m with the difference e2m under a predetermined value k2 for all timings. When such a linear equation is formulated as an adjacent station approximation equation, the reception unit 13 determines that the transition trend of the reception level of the radio wave received from an adjacent station is in an upturn trend and stable.

In FIG. 3B, although the difference e2m is under the predetermined value k2 for all timings, the equation of a line graph has a negative coefficient a2m. When such a linear equation is formulated as an adjacent station approximation equation, the reception unit 13 determines that the transition trend of the reception level of the radio wave received from an adjacent station is in a downturn trend, though it is stable.

In FIG. 3C, although the coefficient a2m has a positive value, the difference e2m exceeds the predetermined value k2 at some timings, failing to be within a range of value k2 for all timings. When such a linear equation is formulated as an adjacent station approximation equation, the reception unit 13 determines that the transition trend of the reception level of the radio wave received from an adjacent station is in an upturn trend, with unstableness in the trend.

After determining (a) the transition trend of the reception level of the radio wave received from a serving station and (b) the transition trend and stability of the reception level of the radio wave received from an adjacent station, the reception unit 13 outputs to the targeting unit 14 the determination result about the adjacent station, and outputs to the handover unit 15 the determination result about the serving station and the determination result about the adjacent station.

In the present embodiment, the reception unit 13 retrieves the serving station and the adjacent station reception history for "five latest timings" in order to formulate an approximation equation. However, the number of retrieved timings from the history may be other than five. Further, "5%" of the calculation value y2m[t] at time t="n" is adopted as the predetermined value k2 in the present embodiment, the calculation value y2m[t] at other times t="n−1" to "n−4" may also be adopted, and/or "5%" may be changed to "1%" or to "10%." Further, in the present embodiment, the difference e2 between the calculation value y2[n] and the instantaneous value Y2[n] is examined for all of five timings (i.e., t="n" to "n−4") by the reception unit 13, in terms of whether it is under the predetermined value. However, the examination of the difference within the k2 range at all timings may be changed to three timings out of five, that is, 60% of all timings, for example.

As shown in FIG. 1, the targeting unit 14 is connected to the reception unit 13 and the handover unit 15. When it is determined by the reception unit 13 that the transition trend of the reception level of the received radio wave from an adjacent station is in an upturn trend and stable, such adjacent station is selected as a target station.

Specifically, at first, after having an input of the determination result from the reception unit 13, the targeting unit 14 determines the number of adjacent stations which are determined to have the upturn and stable transition trend of the reception level of the radio wave received by the radio 30. If the number of such adjacent stations is determined to be "zero," the targeting unit 14 outputs a "no target station" signal indicative of finding no target station to the handover unit 15. If the number of such adjacent stations is determined to be "one," the targeting unit 14 selects such adjacent station as a target station, and outputs the station identification information of the selected adjacent station to the handover unit 15. If the number of such adjacent stations is determined to be "more than one," the targeting unit 14 selects an adjacent station having a greatest calculation value y2m[t] at time t="n" as a target station, and outputs the station identification information of the selected target station to the handover unit 15.

Figure 4:
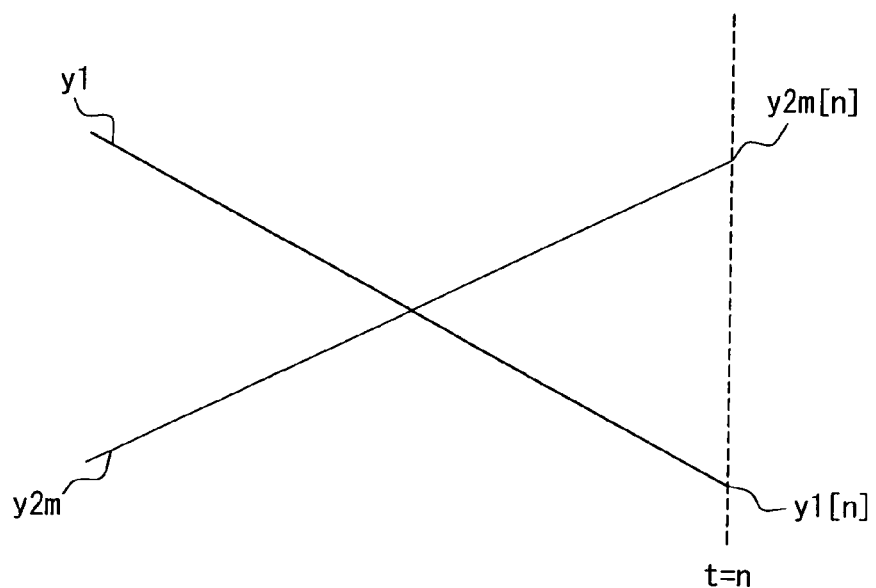
FIG. 4 is a diagram of reception level transition of the radio waves from the serving station and the target station at a time of handover in the embodiment of the present disclosure.

As shown in FIG. 1, the handover unit 15 is connected to each of the reception unit 13, the targeting unit 14, and the radio 30. When (a) the station identification information is inputted from the targeting unit 14, (b) the reception unit 13 determines that the transition trend of the reception level of the received radio wave is in a downturn, and (c) the reception unit 13 determines that the calculation value of the serving station approximation equation at the above determination timing is smaller than the calculation value of the adjacent station approximation equation at the above determination timing (see FIG. 4), the handover unit 15 performs handover for switching the serving station to a target station selected by the targeting unit 14. If the targeting unit 14 does not identify a target station then the handover unit 15 does not carry out handover from a serving station to a target station because no target station signal indicates there is no communication station to which a serving station is switched.

When the station identification information is inputted from the targeting unit 14, the handover unit 15 first determines, based on the inputted determination result from the reception unit 13, whether the coefficient "a1" of the serving station approximation equation has a "minus (−)" value. If the value is not "minus," indicating that the value of the coefficient "a1" is either "plus" or "zero," it is likely that the reception level of the radio wave received from the serving station is not going to decrease. Therefore, the handover unit 15 does not carry out handover to the target station. On the other hand, if the coefficient "a1" is determined to be "minus," it is highly likely that the reception level of the radio wave received from the serving station is decreasing. The handover unit 15 next determines whether the calculation value y1[n] of the serving station approximation equation at time t="n" is smaller than the calculation value y2m[n] of the adjacent station approximation equation at time t="n."

After the above determination, the handover control is performed in the following manner. The handover unit 15 does not carry out handover from a serving station to a target station upon having a determination result that the calculation value y1[n] is greater than the calculation value y2m[n] because the reception level of the radio wave to be received may possibly become weaker after performing handover. The handover unit 15 does perform handover from a serving station to a target station upon having a determination result that the calculation value y1[n] is equal to or smaller than the calculation value y2m[n], because the reception level of the radio wave to be received may possibly become stronger after performing handover.

Figure 5A:
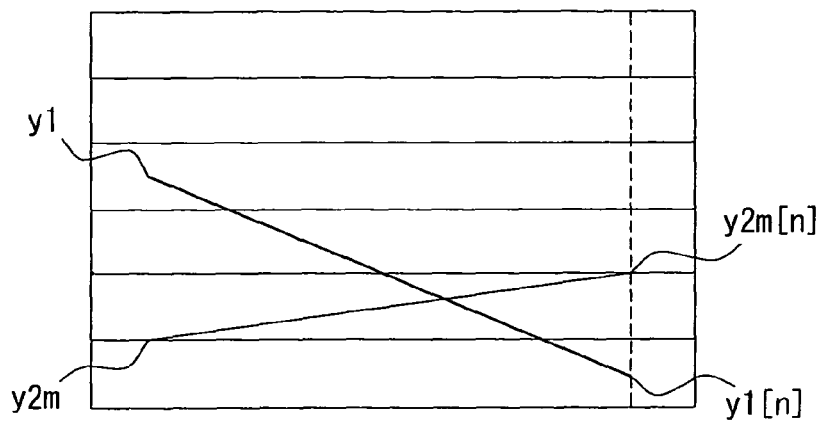
FIGS. 5A, 5B, and 5C are diagrams of reception level transition of the radio waves from the serving station and the target station at a time of handover and at a time of no handover, in the embodiment of the present disclosure.

FIG. 5A shows an illustration of a decreasing transition trend of the reception level of the radio wave received from a serving station, and the calculation value y1[n] of the serving station approximation equation at the handover determination timing being smaller than the calculation value y2m[n] of the adjacent station approximation equation. In this case, the handover unit 15 performs handover from a serving station to a target station.

Figure 5B:
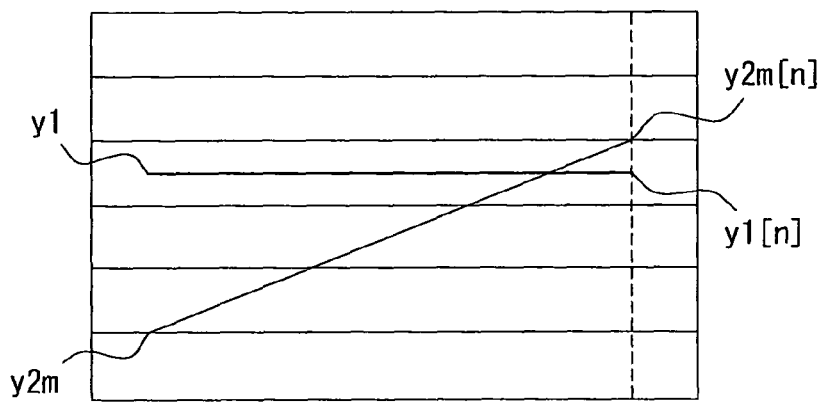

FIG. 5B shows an illustration of a transition trend of the reception level of the radio wave received from a serving station showing none of an upturn or a downturn, and the calculation value y1[n] of the serving station approximation equation at the handover determination timing being smaller than the calculation value y2m[n] of the adjacent station approximation equation. In this case, the handover unit 15 does not carry out handover from a serving station to a target station, because the reception level of the radio wave received from a serving station is not going to decrease, thereby preventing the decrease of throughput due to performing handover.

Figure 5C:
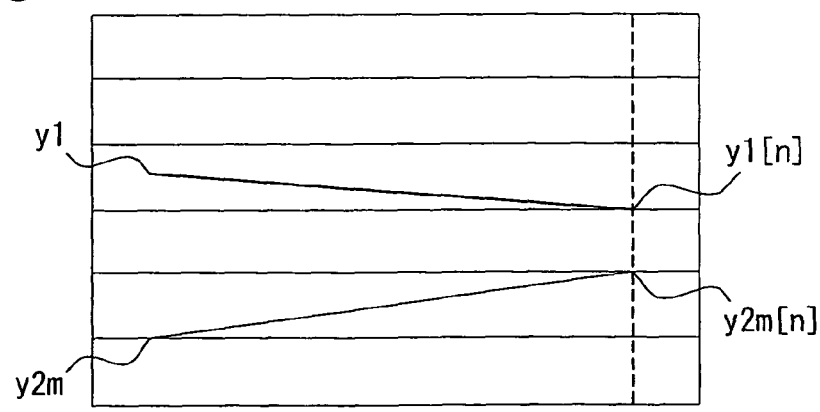

FIG. 5C shows an illustration of a decreasing transition trend of the reception level of the radio wave received from a serving station, and the calculation value y1[n] of the serving station approximation equation at the handover determination timing being greater than the calculation value y2m[n] of the adjacent station approximation equation. In this case, the handover unit 15 does not carry out handover from a serving station to a target station, because it is likely that the reception level of the radio wave received from a serving station becomes weaker after handover (i.e y1[n] is greater than y2m[n]).

Figure 6:
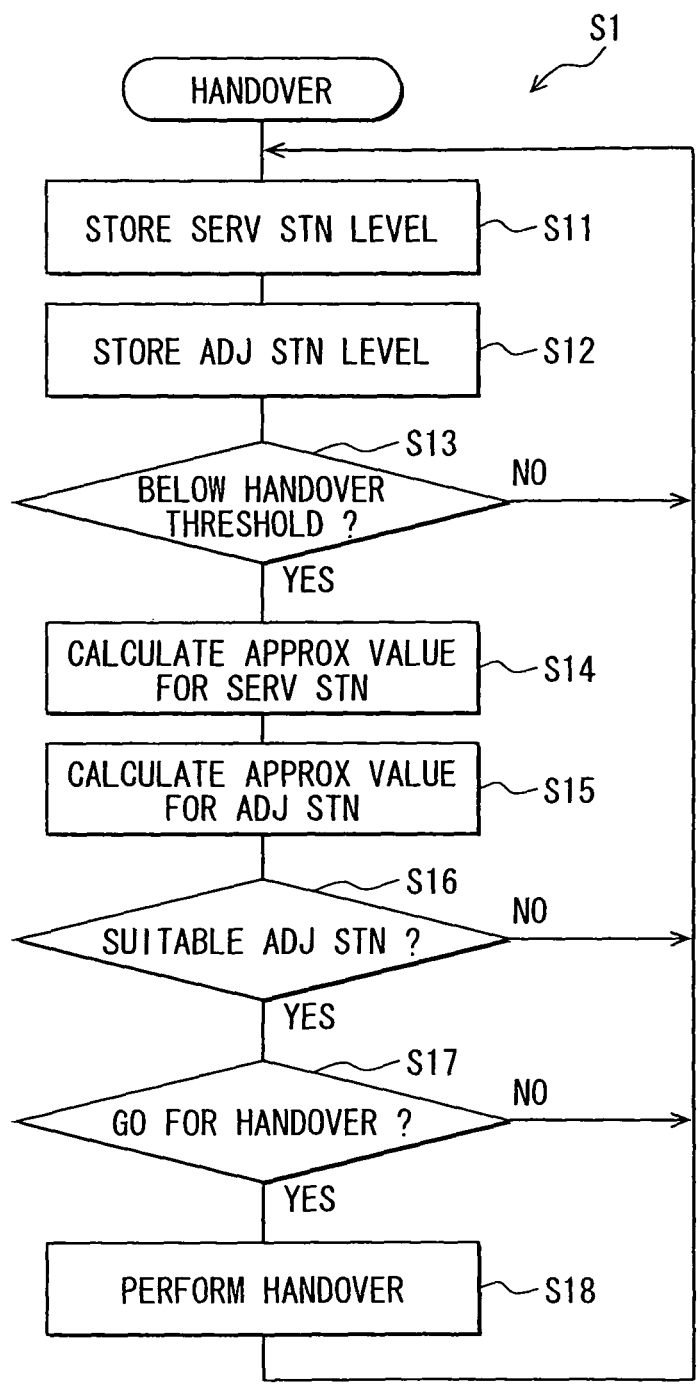
FIG. 6 is a flowchart of a handover process in the embodiment of the present disclosure.

FIG. 6 is a flowchart of a handover process S1 performed by the handover control apparatus 10. Operation of the handover control apparatus 10 is explained in the following with reference to FIG. 6. In step S11 the reception level of the radio wave received from a serving station is memorized in the memory 20. As the serving station reception history, the handover control apparatus 10 memorizes in the memory 20 an instantaneous value of the reception level of the radio wave from the serving station received by the radio 30, the reception time information indicative of a reception time of the radio wave, and the station identification information for identifying the serving station.

In step S12, the process S1 saves the reception level of the radio wave received from the adjacent station in the memory 20. As an adjacent station reception history, the handover control apparatus 10 memorizes in the memory 20 an instantaneous value of the reception level of the radio wave from the adjacent station received by the radio 30, the reception time information indicative of a reception time of the radio wave, and the station identification information for identifying the adjacent station.

In step S13, the process S1 determines whether an instantaneous value of the reception level of the radio wave received from the serving station is equal to or smaller than the handover threshold. If it is determined that the instantaneous value of the reception level is not equal to or smaller than the handover threshold, (i.e., determination of step S13 is "No"), the process S1 returns to step S11, to repeat step S11. On the other hand, if the instantaneous value of the reception level of the radio wave received from the serving station is equal to or smaller than the handover threshold (i.e., determination of step S13 is "Yes"), then the process S1 proceeds to step S14. The determination process of step S13 performed by the handover control apparatus 10 corresponds to the determination timing in claims. Further, the input timing of the signal which indicates necessity to carry out handover from the determination unit 12 to the reception unit 13 corresponds to the determination timing in claims.

In step S14, the process S1 formulates a serving station approximation equation based on the instantaneous values at the latest "n" timings. Specifically, by retrieving the serving station reception history for five latest points in time including a point in time of the determination processing of above step S13 from the memory 20, the reception unit 13 of the handover control apparatus 10 calculates the coefficients "a1" and "b1" in the serving station approximation equation "y1[t]=a1·t+b1."

In step S15, the process S1 uses the instantaneous values at latest "n" points in time to formulate an adjacent station approximation equation. Specifically, by retrieving the adjacent station reception history for five latest points in time including a point in time of the determination processing of above step S13 from the memory 20, the reception unit 13 of the handover control apparatus 10 calculates the coefficient "y2m" and "b2m" in the adjacent station approximation equation "y2m[t]=a2m·t+b2m."

After step S15, the process 51 proceeds to step S16 to determine whether there is one most suitable adjacent station (i.e., a target station). When it is determined that there is no suitable adjacent station (i.e., determination of step S16 is "No"), the process S1 returns to step S11. On the other hand, when it is determined that there is a most suitable adjacent station (i.e., determination of step S16 is "Yes"), then the process S1 proceeds to step S17.

Specifically, at first, the handover control apparatus 10 determines the number of the adjacent stations which are determined to have the upturn and stable transition trend of the reception level of the radio wave received by the radio 30. When the number of such adjacent stations is determined to be "zero," the target unit 14 of the handover control apparatus 10 determines that there is no suitable adjacent station. When the number of such adjacent stations is determined to be "one" then the target unit 14 selects that station as the most suitable adjacent station. When the number of such adjacent stations is determined to be "more than one," then the target unit 14 selects as a target station an adjacent station having a greatest calculation value y2m[t] at the above determination timing.

Then, in step S17, the process S1 determines whether the handover from a serving station to a target station should be performed. Specifically, the process S1 determines whether (a) the transition trend of the reception level of the received radio wave from the serving station is in a downturn, and (b) the calculation value y1[n] of the serving station approximation equation at the above determination timing is smaller than the calculation value y2m[n] of the adjacent station approximation equation. When the determination in step S17 is "No," the process S1 returns to step S11. On the other hand, when the determination in step S17 is "Yes," the process S1 proceeds to step S18 to perform the handover. After the handover is complete the process S1 returns to S11.

Based on a determination that a handover is necessary and needs to be performed, the handover control apparatus 10 of the present embodiment (a) selects, as a target station, an adjacent station which has an "upturn and stable" transition trend of the reception level of the radio wave received by the radio 30, and (b) performs handover to switch from a serving station to a target station, (i) if the transition trend of the reception level of the currently-received radio wave from the serving station is in a downturn trend, and (ii) if the calculation value of the serving station approximation equation at the determination timing is smaller than the calculation value of the adjacent station approximation equation. In this manner, the present disclosure enables a stable wireless communication between a serving station and a terminal after performing handover. The handover control scheme of the present disclosure is clearly advantageous over the technique in JP '654 and its modification described in the background information section, in which the wireless communication between the serving station and the terminal is susceptible to interruption or unstable.

Although the present disclosure has been fully described in connection with preferred embodiment thereof with reference to the accompanying drawings, it is to be noted that various changes and modifications will become apparent to those skilled in the art.

In the above embodiment, the memory controller 11 memorizes, in the memory 20 as the serving station reception history, an instantaneous value of the reception level of the radio wave received by the radio 30 from a serving station at a predetermined regular interval, and also memorizes, in the memory 20 as the adjacent station reception history, an instantaneous value of the reception level of the radio wave received by the radio 30 from an adjacent station at predetermined regular intervals. However, those values may be memorized at intervals different from the above.

For example, the memory controller 11 may memorize, in the memory 20 as the serving station reception history, the reception level of the radio wave received by the radio 30 from a serving station at an interval that is defined in proportion to an increase of a travel speed of the in-vehicle terminal 1 detected by a travel speed sensing device, which detects a travel speed of the in-vehicle terminal 1, and may memorize, in the memory 20 as the adjacent station reception history, the reception level of the radio wave received by the radio 30 from an adjacent station at the same interval.

An example of such interval is shown in a table in FIG. 7. Assuming that a value of "m" second is a sampling interval for the travel speed in a range of 20 to 40 km/h, a sampling interval for the travel speed in a range of 0 to 20 km/h may take a value of "1.2m" seconds, a sampling interval for the travel speed in a range of 40 to 60 km/h may take a value of "0.8m" seconds, a sampling interval for the travel speed in a range of 60 to 80 km/h may take a value of "0.6m" seconds, and a sampling interval for the travel speed in a range of over 80 km/h may take a value of "0.4m" seconds. The sampling interval in FIG. 7 means the regular interval described above.

Further, the memory controller 11 may memorize, in the memory 20 as the serving station reception history, the reception level of the radio wave received by the radio 30 from a serving station at an interval that allows a constant travel distance of the in-vehicle terminal 1 based on the travel speed of the in-vehicle terminal 1 detected by a travel speed sensing device, and may memorize, in the memory 20 as the adjacent station reception history, the reception level of the radio wave received by the radio 30 from an adjacent station at the same interval.

More practically, the memory controller 11 memorizes the serving station reception history and the adjacent station reception history in the memory 20 at every "1.8" seconds for the travel speed of 20 km/h, at every "0.9" seconds for the travel speed of 40 km/h, or at every "0.6" seconds for the travel speed of 60 km/h. In this manner, the memory controller 11 memorizes the serving station reception history and the adjacent station reception history at every travel distance of "10" meters of the in-vehicle terminal 1.

Alternatively, the memory controller 11 may memorize the serving station reception history and the adjacent station reception history in the memory 20 at every "3.6" seconds for the travel speed of 20 km/h, at every "1.8" seconds for the travel speed of 40 km/h, or at every "1.2" seconds for the travel speed of 60 km/h. In this manner, the memory controller 11 memorizes the serving station reception history and the adjacent station reception history at every travel distance of "20" meters of the in-vehicle terminal 1.

In the above modification examples, as the travel speed sensing device detecting the travel speed of the in-vehicle terminal 1, a vehicle speed sensor of a vehicle carrying the in-vehicle terminal 1, a navigation system of a vehicle equipped with the in-vehicle terminal 1, or a GPS receiver can be adopted. When the vehicle speed sensor is used, the handover control apparatus 10 is connected to the vehicle speed sensor, and vehicle speed information is configured to be input from the vehicle speed sensor. When the navigation system is used, the handover control apparatus 10 is connected to the navigation system, and vehicle speed information is configured to be input from the navigation system. When the GPS receiver is used, the handover control apparatus 10 is connected to the GPS receiver, and the travel speed is calculated based on a GPS signal received by the GPS receiver.

Further, the memory controller 11 may memorize in the memory 20 the reception level of the radio wave received by the radio 30 from a serving station at an interval that decreases in proportion to an increase of the number of handover operations, and may memorize in the memory 20 the reception level of the radio wave received by the radio 30 from an adjacent station at the same interval.

An example of such interval is shown in a table in FIG. 8. Assuming that a value of "m" second is a sampling interval for 1 to 2 handover operations per unit time, a sampling interval for no (=zero) handover operation per unit time may take a value of "1.2m" seconds, a sampling interval for 3 to 4 handover operations per unit time may take a value of "0.8m" seconds, and a sampling interval for 5 or more handover operations per unit time may take a value of "0.6m" seconds.

In the above embodiment, the targeting unit 14 selects, as a target station, an adjacent station having a greatest calculation value y2m[t] at time t="n," when multiple adjacent stations are determined to have an upturn and stable transition trend of the reception level of the radio wave received by the radio 30. However, the target station may be selected differently.

For example, the targeting unit 14 may select one of multiple adjacent stations having the greatest instantaneous value Y2m[t] at time t="n" as a target station, when those adjacent stations are determined to have an upturn and stable transition trend of the reception level of the radio wave received by the radio 30.

Alternatively, the targeting unit 14 may select one of multiple adjacent stations having the greatest calculation value y2m[t] at some time (e.g., 5 seconds) after time t="n" as a target station, when those adjacent stations are determined to have an upturn and stable transition trend of the reception level of the radio wave received by the radio 30.

Figure 9A:
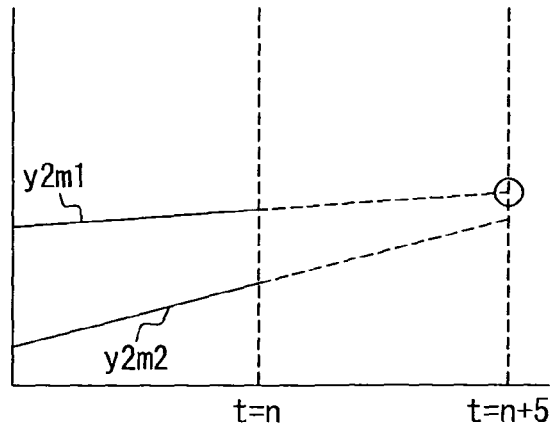
FIGS. 9A, 9B, 9C are illustrations of transition of two adjacent station approximation equations at two determination timings separated by a predetermined time distance (time t=n and time t=n+5) in a modification of the embodiment of the present disclosure.
Figure 9B:
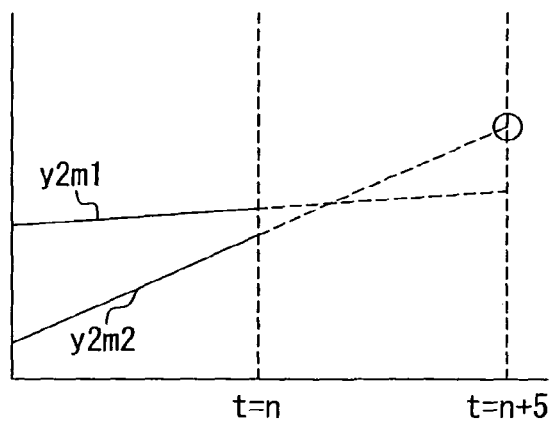
Figure 9C:
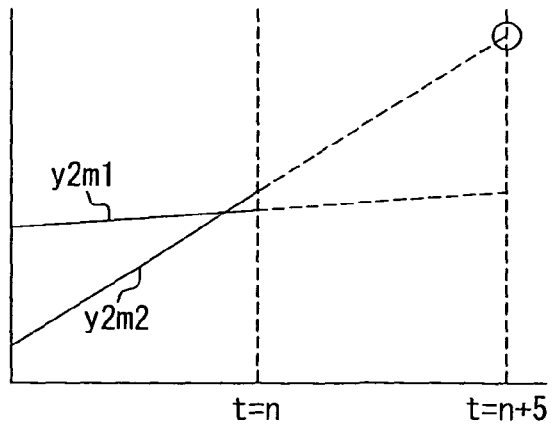

The transition of two adjacent station approximation equations y2m1[t] and y2m2[t] is shown in FIGS. 9A, 9B and 9C, from time t="n" to time t="n+5," which is after a certain time distance from the determination timing. FIG. 9A shows a situation that both of two calculation values y2m1[t] by using the adjacent station approximation equation at time t="n" and at time t="n+5" are greater than the calculation values y2m2[t] by using the adjacent station approximation equation at corresponding times t="n" and "n+5." In such a case, the targeting unit 14 selects as a target station an adjacent station y2m1[t].

FIG. 9B shows a situation that (a) the calculation value y2m1[t] by using the adjacent station approximation equation at time t="n" is greater than the calculation value y2m2[t] by using the adjacent station approximation equation at corresponding time t="n," but (b) the calculation value y2m1[t] by using the adjacent station approximation equation at time t="n+5" is smaller than the calculation value y2m2[t] by using the adjacent station approximation equation at corresponding time t="n+5." In such a case, the targeting unit 14 selects as a target station an adjacent station y2m2[t].

FIG. 9C shows a situation that both of two calculation values y2m2[t] by using the adjacent station approximation equation at time t="n" and at time t="n+5" are greater than the calculation values y2m1[t] by using the adjacent station approximation equation at corresponding times t="n" and "n+5." In such a case, the targeting unit 14 selects as a target station an adjacent station y2m2[t]. The time after the determination timing may be different from above-described 5 seconds. The time after the determination timing may preferably be defined as a minimum time that allows stabilization of the throughput after performing handover from a serving station to a target station.

In the above embodiment, the reception unit 13 formulates a linear equation as a serving station approximation equation, and a linear equation as an adjacent station approximation equation. However, as a serving station approximation equation and an adjacent station approximation equation, a higher-degree equation such as a quadratic equation may be formulated.

The following example describes use of a quadratic equation. when the determination unit 12 sends a signal to the reception unit 13 indicating that a handover is necessary and needs to be performed, the reception unit 13 retrieves from the memory 20 the serving station reception history for five latest points in time (i.e., time t="n" to "n−4") including time t="n" of the signal input timing. After retrieving the serving station reception history, the reception unit 13 calculates coefficients "a12" "b12" and "c12" in the serving station approximation equation "y1[t]=a12·t^2+b12·t+c12," by using the least-square method.

In the same manner, upon having an input of a signal indicative of handover necessity from the determination unit 12, the reception unit 13 retrieves the adjacent station reception history for five latest points, including an input timing of the necessity signal from the memory 20. After retrieving the adjacent station reception history, the reception unit 13 calculates coefficients "a22m" "b22m" and "c22m" in the adjacent station approximation equation "y2m[t]=a22m·t^2+b22m·t+c22m," by using the least-square method.

When the calculation value y12[t] at time t="n" by the serving station approximation equation is greater than the calculation value y12[t] at time t="n−4," the reception unit 13 determines that the transition trend of the reception level of the received radio wave from the serving station is "in an upturn trend." When the calculation value y12[t] at time t="n" by the serving station approximation equation is smaller than the calculation value y12[t] at time t="n−4," the reception unit 13 determines that the transition trend of the reception level of the received radio wave from the serving station is "in a downturn trend." When the calculation value y12[t] at time t="n" by the serving station approximation equation is same as the calculation value y12[t] at time t="n−4," the reception unit 13 determines that the transition trend of the received reception level of the radio wave from the serving station is "neither in an upturn trend nor a downturn trend." In the above, time t="n" and time t="n−4" serve as two determination timings in claims.

Similarly, the calculation value y22m[t] at time t="n" by the adjacent station approximation equation is greater than the calculation value y22m[t] at time t="n−4," the reception unit 13 determines that the transition trend of the reception level of the received radio wave from the adjacent station is "in an upturn trend." When the calculation value y22m[t] at time t="n" by the adjacent station approximation equation is smaller than the calculation value y22m[t] at time t="n−4," the reception unit 13 determines that the transition trend of the reception level of the received radio wave from the adjacent station is "in a downturn trend." When the calculation value y22m[t] at time t="n" by the adjacent station approximation equation is same as the calculation value y22m[t] at time t="n−4," the reception unit 13 determines that the transition trend of the received reception level of the radio wave from the adjacent station is "neither in an upturn trend nor a downturn trend." In the above, time t="n" and time t="n−4" serve as two determination timings in claims.

Figure 10A:
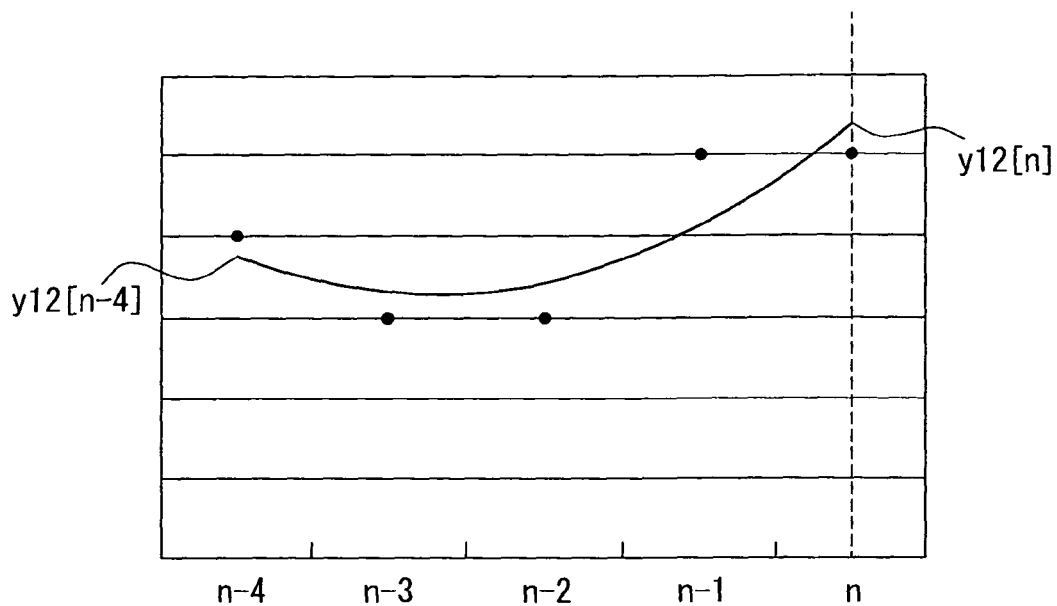
FIGS. 10A and 10B are illustrations of transition of reception levels of the adjacent station approximated by a quadratic equation in a modification of the embodiment of the present disclosure.
Figure 10B:
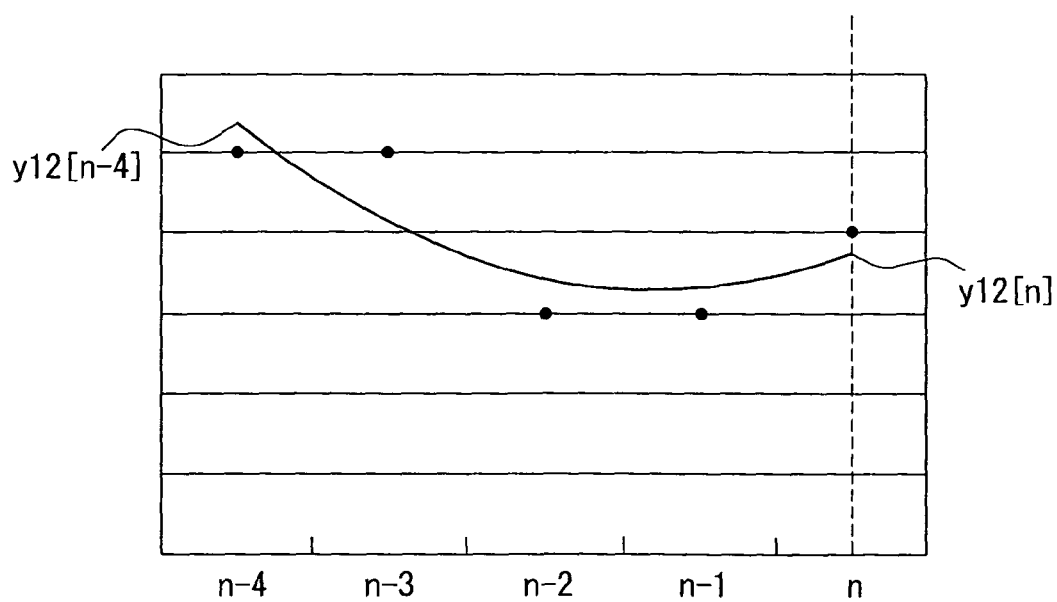

FIGS. 10A and 10B give an example of a parabola for a positive coefficient "a12". In FIG. 10A, when a serving station approximation equation is formulated, the reception unit 13 determines that the transition trend of the reception level of the radio wave received from the serving station is in an upturn trend, because y12[n]>y12[n−4]. In FIG. 10B, when a serving station approximation equation is formulated, the reception unit 13 determines that the transition trend of the reception level of the radio wave received from the serving station is in a downturn trend, because y12[n]<y12[n−4].

Figure 11A:
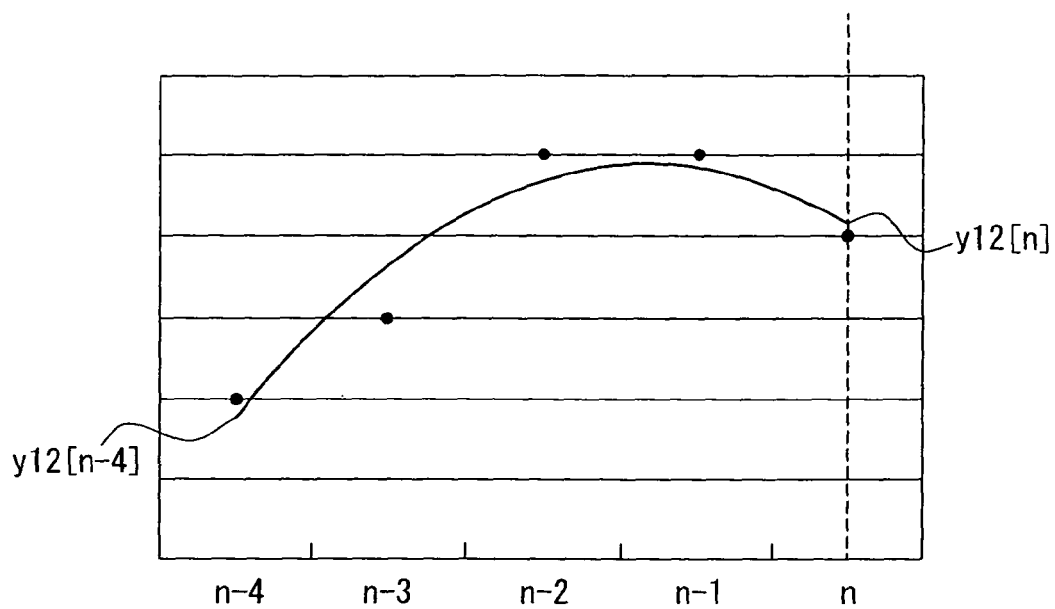
FIGS. 11A and 11B are illustrations of transition of reception levels of the adjacent station approximated by a quadratic equation in a modification of the embodiment of the present disclosure.
Figure 11B:
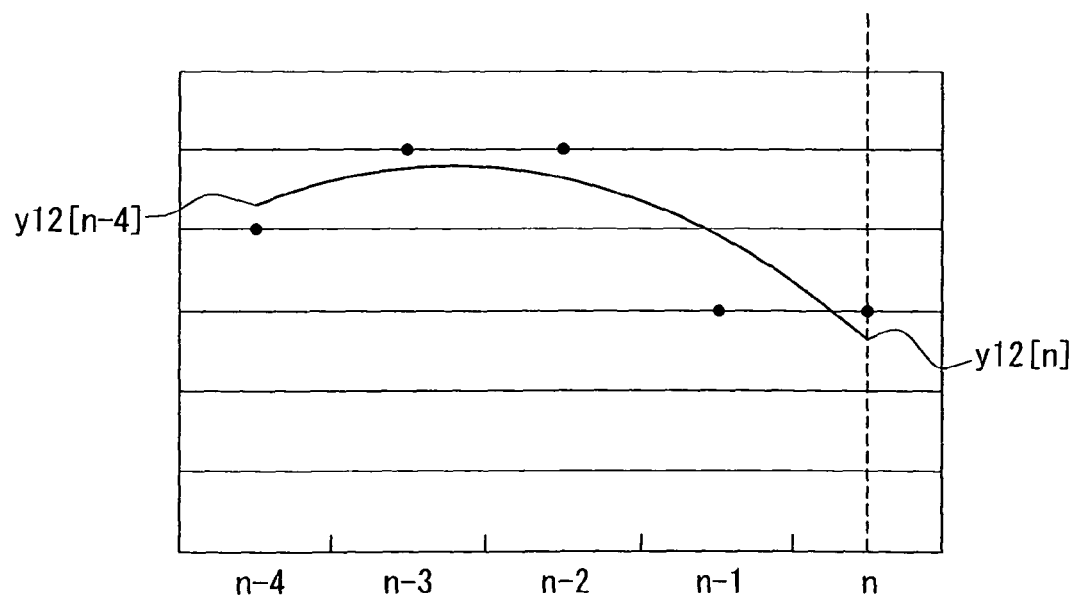
Figure 12:
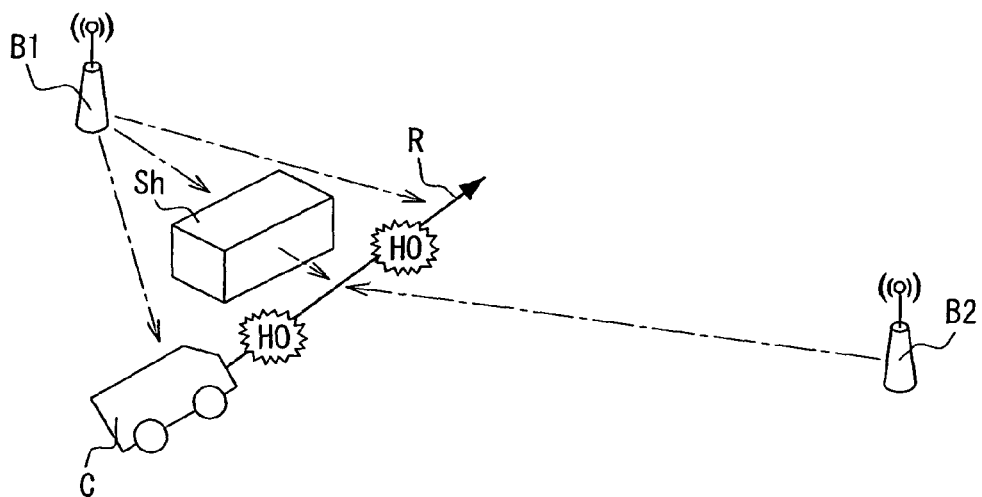
FIG. 12 is an illustration of a situation of a traveling vehicle along a route with an in-vehicle terminal that is equipped with a conventional handover control apparatus.
Figure 13:
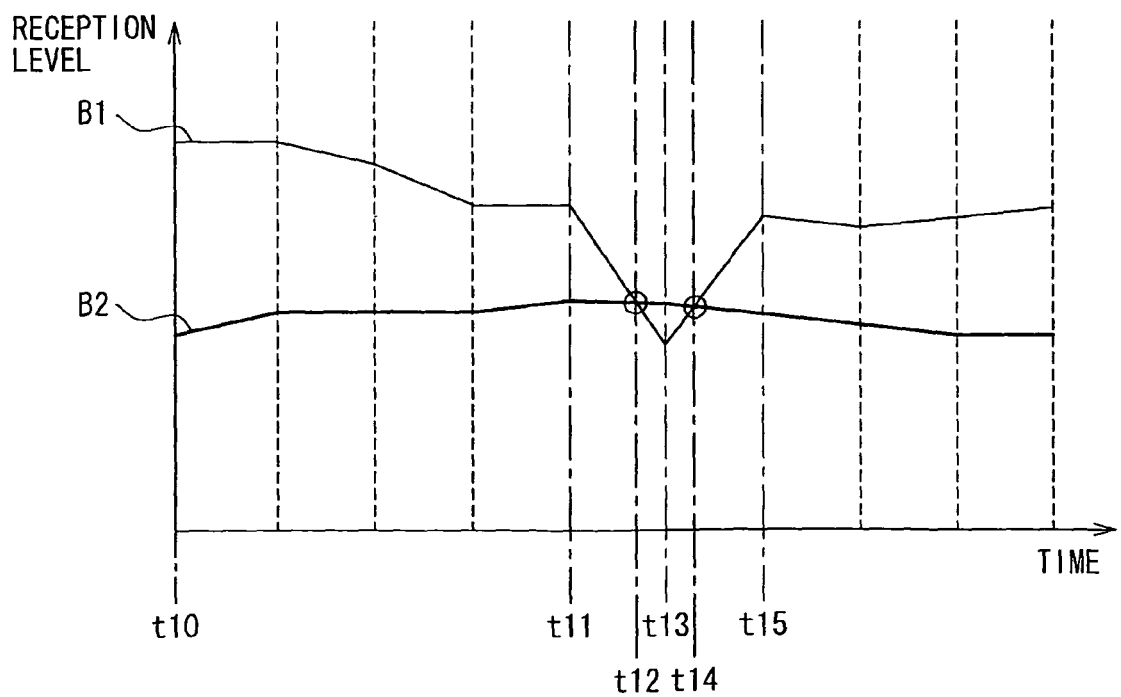
FIG. 13 is a diagram of reception level transitions of a radio wave, one of which is received by the in-vehicle terminal from a nearby communication station and the other is received by the in-vehicle terminal from a far-off communication station in the situation of FIG. 12.

FIGS. 11A and 11B gives an example of a parabola for a negative coefficient a12. In FIG. 11A, when a serving station approximation equation is formulated, the reception unit 13 determines that the transition trend of the reception level of the radio wave received from the serving station is in an upturn trend, because y12[n]>y12[n−4]. In FIG. 11B, when a serving station approximation equation is formulated, the reception unit 13 determines that the transition trend of the reception level of the radio wave received from the serving station is in a downturn trend, because y12[n]<y12[n−4].

Such changes, modifications, and summarized schemes are to be understood as being within the scope of the present disclosure as defined by appended claims.

What is claimed is:

1. A handover control apparatus installed in a terminal for performing handover between communication stations from a serving station to a target station for wireless communication of the terminal, the target station selected, for next communication with the terminal, from among adjacent stations that are adjacent to the serving station, the apparatus comprising:
a memory controller that stores in a memory unit a serving station reception level by a radio unit as a serving station reception history and an adjacent station reception level by the radio unit as an adjacent station reception history, the serving station reception level and the adjacent station reception level respectively rating a reception level of an electric wave by the radio unit from the communication stations;
a necessity determination unit that determines if a handover is necessary based on the serving station reception level;
a radio wave reception determination unit that determines a transition trend and a stability of the serving station reception level and of the adjacent station reception level based on the serving station reception history and the adjacent station reception history when the handover is determined to be necessary;
a target station selection unit that selects the adjacent station as the target station when the adjacent station reception level is determined to be in an upturn trend and stable by the radio wave reception determination unit; and
a handover perform unit that performs the handover when the radio wave reception determination unit determines (a) that the serving station reception level is in a downturn trend and (b) that the serving station reception level at a determination timing for determining that the handover is necessary is lower than the target station reception level.

2. The handover control apparatus of claim 1, wherein the necessity determination unit determines that the handover is necessary based on a determination that the serving station reception level is lower than a handover threshold.

3. The handover control apparatus of claim 1, wherein the memory controller stores the serving station reception level at regular intervals as the serving station reception history, and
the radio wave reception determination unit (a) formulates a serving station reception level approximation equation based on the serving station reception history at a predetermined number of timings including the determination timing, and (b) estimates a transition trend of the serving station reception level by using the serving station reception level approximation equation.

4. The handover control apparatus of claim 3, wherein the radio wave reception determination unit formulates a high-degree equation as the serving station reception level approximation equation, and
the radio wave reception determination unit estimates the transition trend of the serving station reception level either as an upturn trend, a downturn trend, or a stable trend by using the approximation equation based on a calculation of two reception levels at a prior-to-determination timing and at the determination timing in the serving station reception history and based on comparison between calculated reception levels.

5. The handover control apparatus of claim 3, wherein the radio wave reception determination unit formulates a linear equation as the serving station reception level approximation equation, and
the radio wave reception determination unit estimates the transition trend of the serving station reception level either as an upturn trend, a downturn trend, or a stable trend based on a coefficient of the linear equation having a positive value, a negative value, or a null value.

6. The handover control apparatus of claim 3, wherein the radio wave reception determination unit estimates a stability of the adjacent station reception level based on (a) a reception level calculation value of an adjacent station reception level approximation equation at each of plural timings which are used to formulate the adjacent station reception level approximation equation and (b) an instantaneous adjacent station reception level at the same timings.

7. The handover control apparatus of claim 6, wherein the radio wave reception determination unit calculates a difference between the reception level calculation value of the adjacent station reception level approximation equation and the instantaneous reception level at each of the plural timings, and determines whether the difference is equal to or smaller than a threshold at all of the timings, and
the radio wave reception determination unit estimates (a) that the transition trend of the adjacent station reception level is stable when the difference is equal to or smaller than the threshold at all of the timings, and (b) that the transition trend of the adjacent station reception level is not stable when the difference is not equal to or smaller than the threshold at at least one of the timings.

8. The handover control apparatus of claim 6, wherein the target station selection unit selects, from among a plurality of adjacent stations having the reception level being in the upturn trend and stable, a target station that has a greatest instantaneous value of the reception level at the determination timing.

9. The handover control apparatus of claim 6, wherein the target station selection unit selects, from among a plurality of adjacent stations having the reception level being in the upturn trend and stable, a target station that has a greatest calculation value of the reception level by using the adjacent station reception level approximation equation at a timing that is set after a preset time from the determination timing.

10. The handover control apparatus of claim 3, wherein the memory controller stores in the memory unit as the serving station reception history the serving station reception level at an interval that decreases in proportion to an increase of a travel speed of the terminal detected by a travel speed detector.

11. The handover control apparatus of claim 3, wherein the memory controller stores in the memory unit as the adjacent station reception history the adjacent station reception level at an interval that decreases in proportion to an increase of a travel speed of the terminal detected by a travel speed detector.

12. The handover control apparatus of claim 3, wherein the memory controller stores in the memory unit as the serving station reception history the serving station reception level at an interval that defines a constant travel distance of the terminal based on a travel speed of the terminal detected by a travel speed detector.

13. The handover control apparatus of claim 3, wherein the memory controller stores in the memory unit as the adjacent station reception history the adjacent station reception level at an interval that defines a constant travel distance of the terminal based on a travel speed of the terminal detected by a travel speed detector.

14. The handover control apparatus of claim 3, wherein the memory controller stores in the memory unit as the serving station reception history the serving station reception level at an interval that decreases in proportion to an increase of handover frequency.

15. The handover control apparatus of claim 3, wherein the memory controller stores in the memory unit as the adjacent station reception history the adjacent station reception level at an interval that decreases in proportion to an increase of handover frequency.

16. The handover control apparatus of claim 1, wherein the memory controller stores at regular intervals in the memory unit the adjacent station reception level as the adjacent station reception history, and
the reception unit (a) formulates an adjacent station reception level approximation equation based on the adjacent station reception history at a predetermined number of timings including the determination timing, and (b) estimates a transition trend of the adjacent station reception level by using the adjacent station reception level approximation equation.

17. The handover control apparatus of claim 16, wherein
the radio wave reception determination unit formulates a high-degree equation as the adjacent station reception level approximation equation, and
the radio wave reception determination unit estimates the transition trend of the adjacent station reception level either as an upturn trend, a downturn trend, or a stable trend by using the approximation equation based on a calculation of two reception levels at a prior-to-determination timing and at the determination timing in the adjacent station reception history and based on comparison between calculated reception levels.

18. The handover control apparatus of claim 16, wherein
the radio wave reception determination unit formulates a linear equation as the adjacent station reception level approximation equation, and
the radio wave reception determination unit estimates the transition trend of the adjacent station reception level either as an upturn trend, a downturn trend, or a stable trend based on a coefficient of the linear equation having a positive value, a negative value, or a null value.

19. The handover control apparatus of claim 16, wherein
the target station selection unit selects, from among a plurality of adjacent stations having the reception level being in the upturn trend and stable, a target station that has a greatest calculation value of the reception level by using the adjacent station reception level approximation equation at the determination timing.

* * * * *